United States Patent
Ferguson

(10) Patent No.: US 7,180,537 B2
(45) Date of Patent: Feb. 20, 2007

(54) RELATIVE CHANNEL DELAY MEASUREMENT

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 484 days.

(21) Appl. No.: 10/780,785

(22) Filed: Feb. 18, 2004

(65) Prior Publication Data

US 2005/0179777 A1 Aug. 18, 2005

(51) Int. Cl.
*H04N 17/02* (2006.01)
(52) U.S. Cl. .................. 348/180; 348/192; 348/520; 324/76.33
(58) Field of Classification Search ................. 348/180, 348/181, 189, 192, 193, 518, 519, 520; 706/66, 706/71; 324/76.12, 76.13, 76.19, 76.77
See application file for complete search history.

(56) References Cited

U.S. PATENT DOCUMENTS

| | | | | |
|---|---|---|---|---|
| 4,133,004 A | * | 1/1979 | Fitts | 348/169 |
| 4,270,143 A | * | 5/1981 | Morris | 348/169 |
| 4,792,846 A | * | 12/1988 | Penny | 348/520 |
| 4,829,366 A | * | 5/1989 | Penney | 348/192 |
| 5,265,121 A | * | 11/1993 | Stewart | 375/346 |
| 6,272,168 B1 | * | 8/2001 | Lomp et al. | 375/222 |

* cited by examiner

*Primary Examiner*—Michael H. Lee
(74) *Attorney, Agent, or Firm*—Francis I. Gray

(57) ABSTRACT

A method of measuring relative channel delay between components of a video signal includes removing a local mean from each of the pair of input component signals and cross-correlating the resulting pair of input component signals. A mean is removed from the cross-correlation and a centroid for the cross-correlation is found within a region bound by nearest zero-crossing to a peak in the cross-correlation. The centroid is then converted to a delay time as a function of sample rate after removing a sample offset. Also a normalized peak value of the cross-correlation provides a figure of merit for the probable accuracy of the delay measurement.

7 Claims, 4 Drawing Sheets

RELATIVE CHANNEL DELAY MEASUREMENT

BACKGROUND OF THE INVENTION

The present invention relates to video measurements, and more particularly to a relative channel delay measurement that is robust in the presence of random noise, compressed video impairments, etc. and may be performed in-service using regular program material.

In the television arts it is of interest to use an automated method to measure the relative delay between pairs of channels among the three components of component analog video and equivalent digital representations. An example is the delay between Y and Pb channels for Y,Pb,Pr component video. Prior measurement methods measure the relative position of either specific edges of a specific part of a line of the video signal, such as the green/magenta transition in a video color bars signal, or the null of the sum or differences of sinusoids with slightly different frequencies, as in the Bowtie signal (see U.S. Pat. No. 4,829,366). In both cases specific signals are used and a small portion of the video line is used to make the measurement. Though these methods are intuitive and practical for manual measurements with a video waveform display, both methods are relatively susceptible to noise interference and are not in-service measurements in that special test signals are used. Also neither method allows for convenient determination of delay at different frequencies or average delays over different bandwidths. Further, automated versions of these methods do not inherently give a figure of merit reflecting the probable inaccuracy of the measurement due to impairments or noise present in the video signal.

Another method does use real program material (see U.S. Pat. No. 4,792,846), detects edge transitions in the components of the program material, and uses one component as a reference channel. The relative time difference between the midpoints of the edge transitions averaged over several transitions determines the amount of channel delay of the other two channels with respect to the reference channel, which delay may be used to resynchronize the channels. However this method also is susceptible to noise and does not inherently give a figure of merit reflecting the probable inaccuracy of the time delay measurements due to impairments or noise in the video signal.

What is desired is to have one method of measurement that is robust in the presence of random noise, compressed video impairments, etc. and may be performed in-service using regular program material. It is also desired to determine a figure of merit correlated to the probable accuracy of the measurement due to impairments, such as those resulting from video compression, and/or noise. Finally it is desired to have a method that works with any component video signal—YPbPr, RGB, high definition, standard definition, computer video, etc.—and with variable sample rates which are not necessarily known a priori or are not related to the clock rate of the corresponding digital video.

BRIEF SUMMARY OF THE INVENTION

Accordingly the present invention provides a method of automatically measuring relative channel delay robustly in the presence of noise or compressed video impairments by removing a local mean from each of a pair of input component signals and cross-correlating the resulting pair of input component signals. A mean is removed from the cross-correlation and a centroid for the cross-correlation is found within a region bound by nearest zero-crossings to a peak in the cross-correlation. The centroid is then converted to a delay time as a function of sample rate after removing a sample offset. The value at the peak in the cross-correlation provides a figure of merit for the probable accuracy of the delay measurements.

The objects, advantages and other novel features of the present invention are apparent from the following detailed description when read in conjunction with the appended claims and attached drawing.

DETAILED DESCRIPTION OF THE INVENTION

Figure 1:
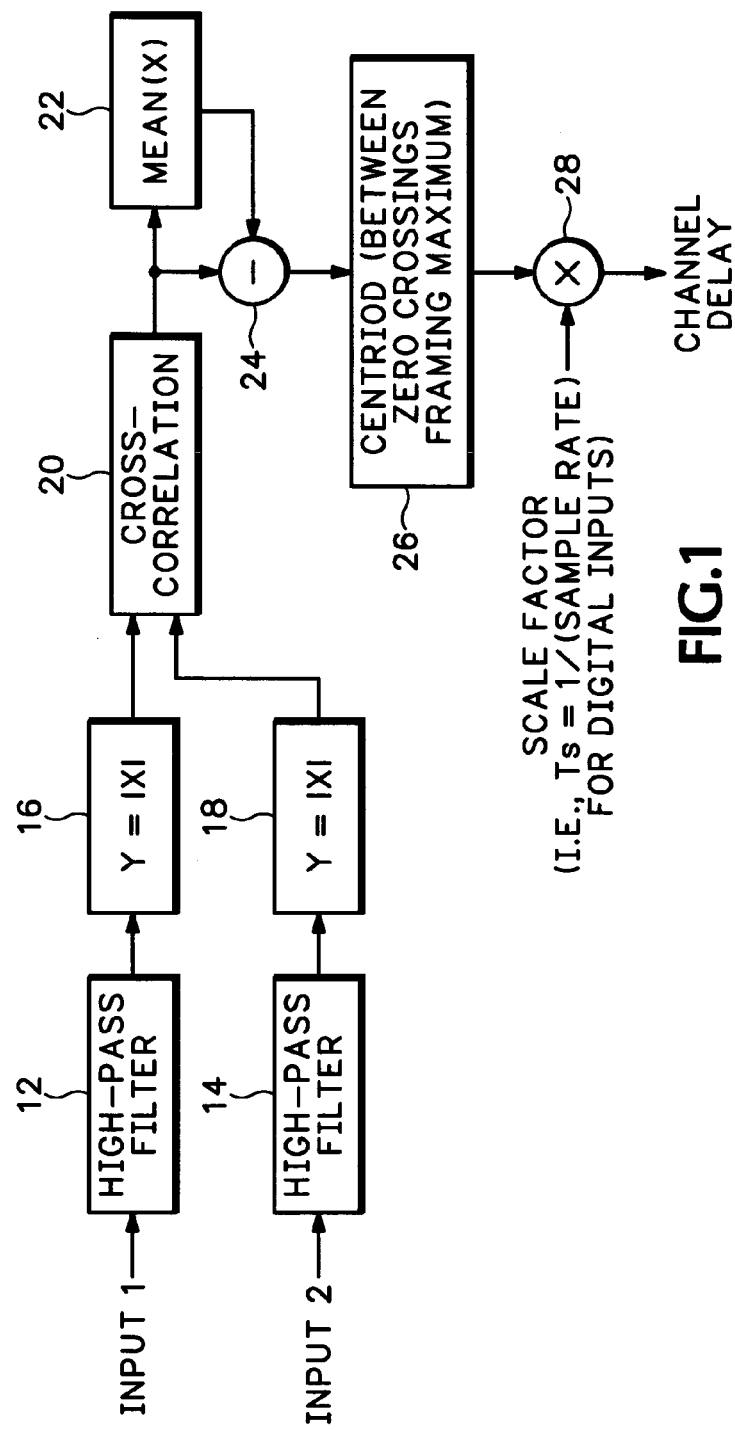
FIG. 1 is a logic block diagram view of an automatic method of measuring relative channel delay according to the present invention.

Referring now to FIG. 1 two channels of a video signal are input to respective high-pass filters 12, 14 in order to remove the local mean from the input signals. This is equivalent to "unsharp" masking used in image processing. The high pass filter is implemented as the difference between the original signal and a unity gain low pass filter and removes DC, ramps, etc., i.e., higher frequency information is used in the subsequent correlation to get better resolution in the delay estimate.

Figure 2:
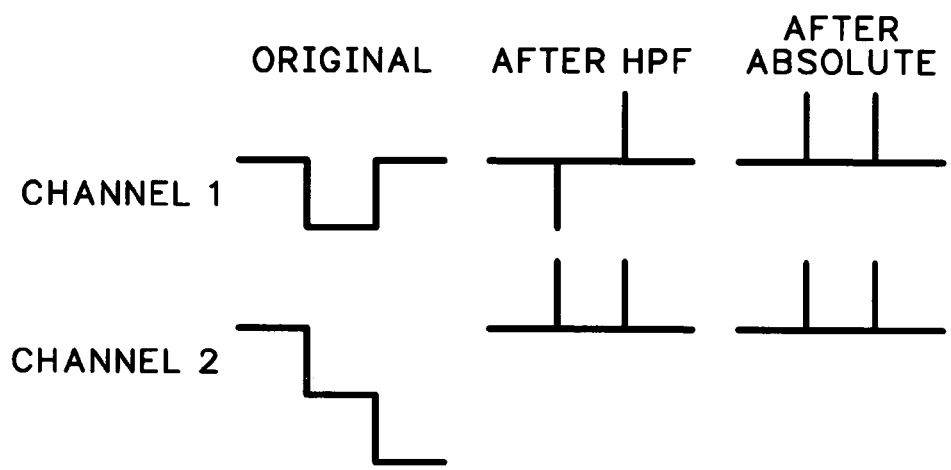
FIG. 2 is a graphic illustration of the conversion of corresponding video components prior to cross-correlation according to the present invention.

The filtered signals are then input (optionally) to respective absolute value modules 16, 18 to get absolute values. This allows signals that have transitions at the same point in time, but different polarities (such as color bars), to be correlated in order to measure delay. In FIG. 2 two component channels are shown with one channel having a pulse configuration and the other a corresponding step configuration. The high pass filtering recovers the edges, but in channel 1 the edges are of opposite polarity. The absolute values are obtained and the edges from the two channels are of the same polarity and may be correlated to measure delay.

The pair of filtered signals are then input to a cross-correlation module 20 to obtain a cross-correlation signal and the location of a maximum between the pair of filtered signals. The cross-correlation signal is input to mean value module 22 to obtain a mean for the cross-correlation signal. The cross-correlation signal and its mean are then input to a subtraction module 24 to remove the mean from the cross-correlation signal. The resulting cross-correlation signal is then input to a centroid module 26 to find both the nearest zero-crossings locations from a peak cross-correlation and between the zero-crossing locations to find a centroid of the peak. Although typically there may be zero-crossings in the original cross-correlation signal before the subtraction module 24 for signals like sweeps and bursts even after the absolute value operation is used, subtracting the mean from the original cross-correlation signal assures zero-crossings in all signals. A sample offset is also removed. The sample offset is a pre-delay used in order to accommodate advances (negative delay) in the measurement.

The centroid is input to a multiplier module 28 to which also is input a scale factor to convert the centroid to a delay time, i.e., delayTime=sampleDelay/sampleRate. The scale factor is used to convert the sample units to time units. If there is a 1.2323 sample delay, using a scale factor of Ts=1/sampleRate with a sampleRate=100 MHz, Ts=10 ns and the delay=1.2323*10 ns=12.324 ns. The normalized cross-correlation value at the peak also is a figure of merit for the probable accuracy of the delay measurement, i.e., the greater the cross-correlation value at the peak the greater the accuracy of the delay measurement.

Figure 3:
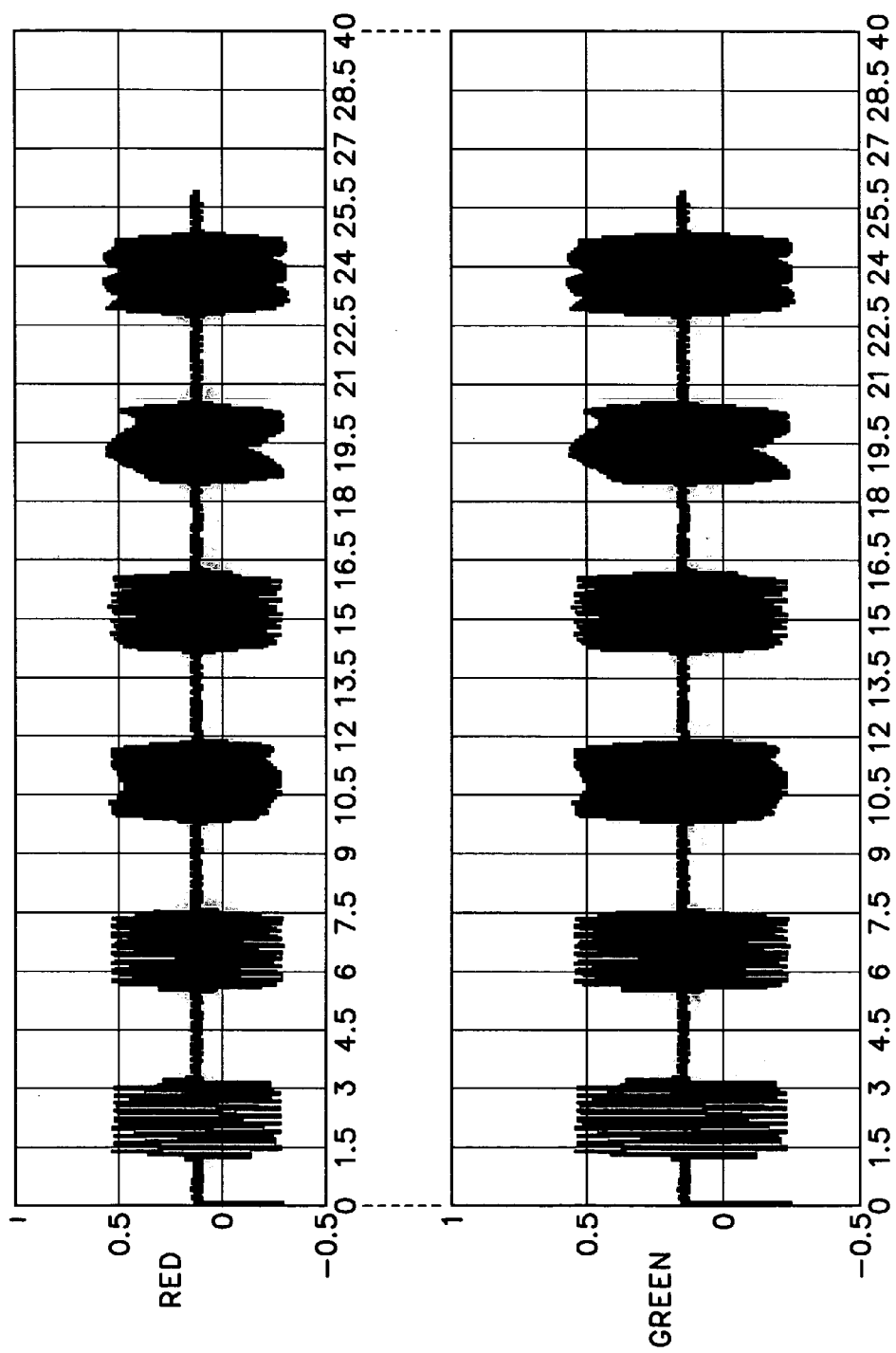
FIG. 3 is a graphic view of a pair of related components of a video signal for measuring relative channel delay according to the present invention.

FIG. 3 illustrates corresponding active regions from a single line of red and green components of an RGB video signal that have been captured for processing (although any pair of components from a component video signal are processed in the same manner), and which are processed as follows:

Step 1: Remove local mean from components signals via the high pass filters 12, 14.

Step 2: (Optional: if correlateTransitions=TRUE) Get absolute values of high passed signals 16,18.

Step 3: Get cross-correlation and location of maximum 20 between each pair of signals.

Step 4: Remove mean from correlation 22, 24.

Figure 4:
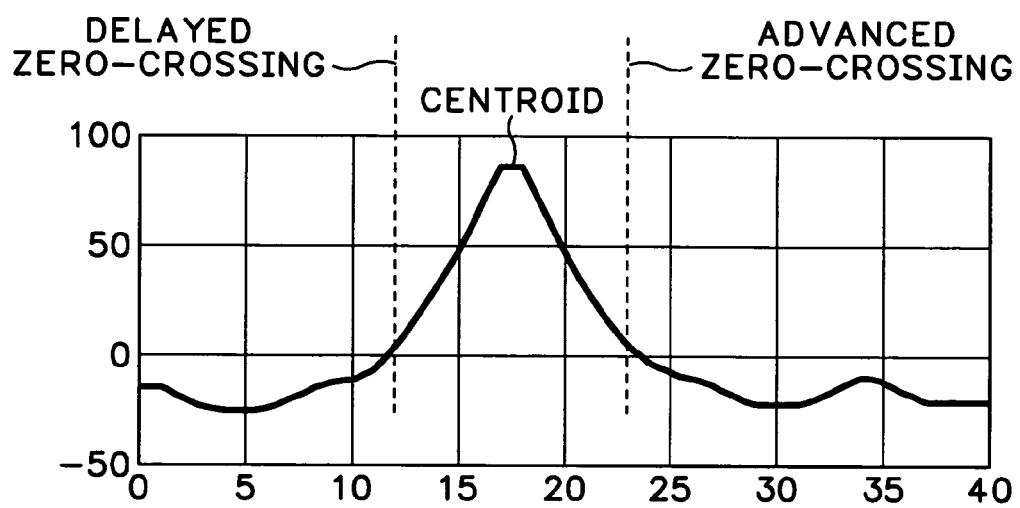
FIG. 4 is a graphic view of a cross-correlation result illustrating finding nearest zero-crossing locations to cross-correlation peak according to the present invention.

Step 5: Find both nearest zero-crossings from maximum (peak) cross-correlation.
  5a: Define search window for advanced (left) and delayed (right) zero crossings of cross-correlation.
  5b: Search backward and forward from the peak for the respective zero crossings. (See FIG. 4)

Step 6: Between zero-crossing locations find centroid of cross-correlation 26.

Figure 5:
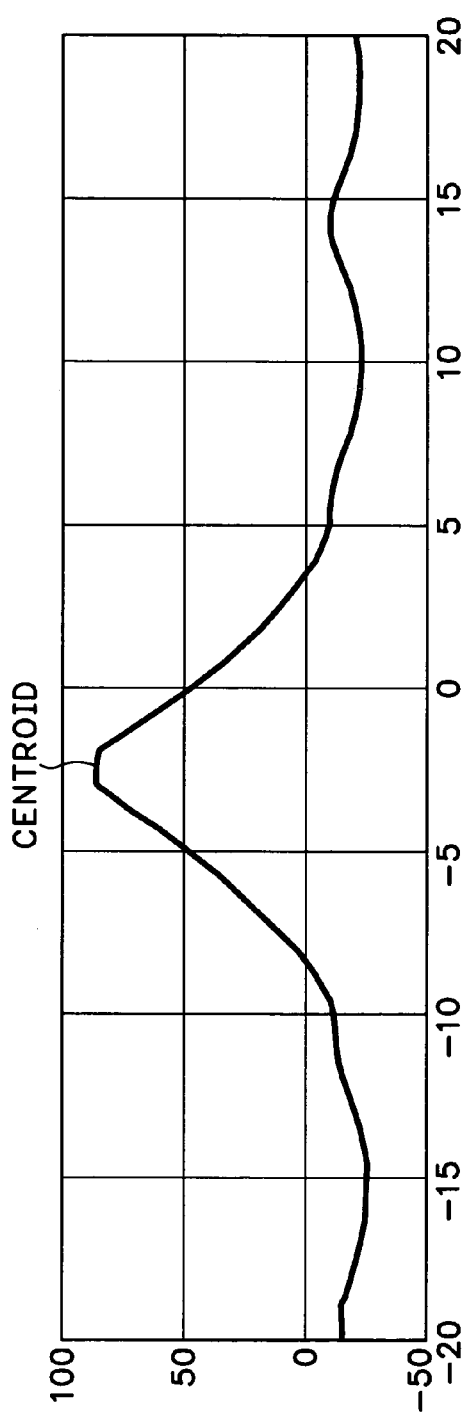
FIG. 5 is a graphic view of the cross-correlation result without sample offset according to the present invention.

Step 7: Remove sample offset. (See FIG. 5)

Figure 6:
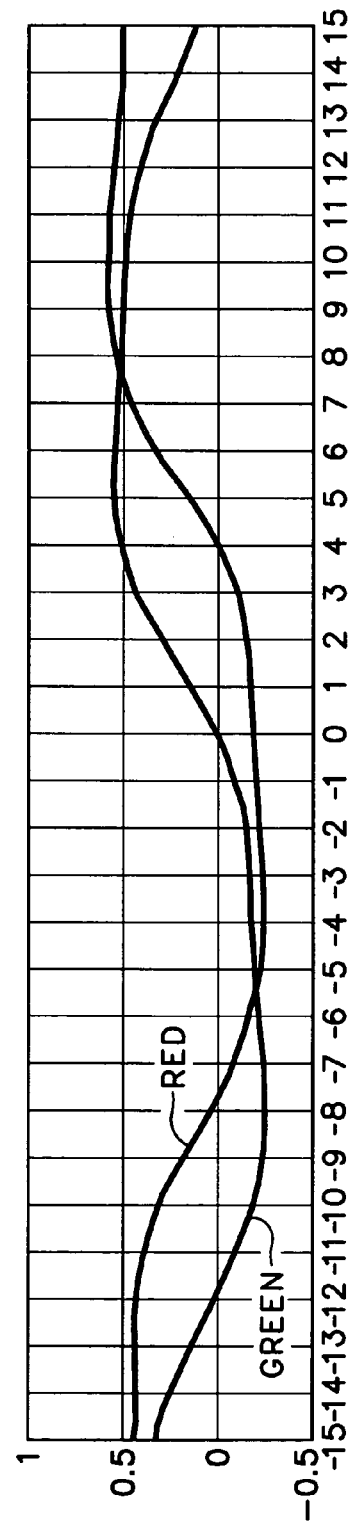
FIG. 6 is a graphic view illustrating the relative channel delay in time between the pair of related components according to the present invention.

Step 8: Convert to time–delayTime=sampleDelay/sampleRate 28. (See FIG. 6)

Thus the present invention provides a relative channel delay measurement method that is robust in the presence of noise and other impairments, that is able to determine delay as a function of frequency and average delay over different bandwidths when sweeps, multibursts or similar sinusoidal signals are used, that is able to use program material (non-specialized test signals) for measurement, and that is able to qualify the accuracy of the measurement via a correlation coefficient taken as the input channel energy normalized to the peak cross-correlation.

What is claimed is:

1. A method of measuring relative channel delay between a pair of component signals of a video signal comprising the steps of:
  removing a local mean from the pair of component signals to produce a pair of filtered component signals;
  obtaining a cross-correlation between the pair of filtered component signals;
  finding a centroid for the cross-correlation; and
  converting the centroid to a delay time as a measure of the relative channel delay.

2. The method as recited in claim 1 further comprising the step of converting the pair of filtered component signals to absolute values prior to the obtaining step.

3. The method as recited in claims 1 or 2 wherein the finding step comprises the steps of:
  locating nearest zero-crossing on each side of a peak in the cross-correlation; and
  finding the centroid between the nearest zero-crossings.

4. The method as recited in claim 3 further comprising the step of removing a sample offset from the centroid to provide a sample delay for input to the converting step.

5. The method as recited in claim 4 wherein the converting step comprises the step of dividing the sample delay by a sample rate to obtain the delay time.

6. The method as recited in claims 1 or 2 further comprising the step of removing a sample offset from the centroid to provide a sample delay for input to the converting step.

7. The method as recited in claim 6 wherein the converting step comprises the step of dividing the sample delay by a sample rate to obtain the delay time.

* * * * *